United States Patent Office 2,968,921
Patented Jan. 24, 1961

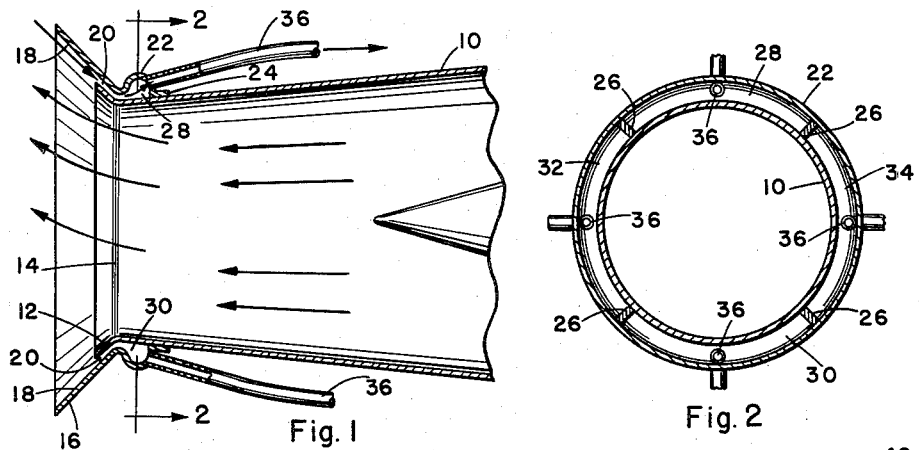
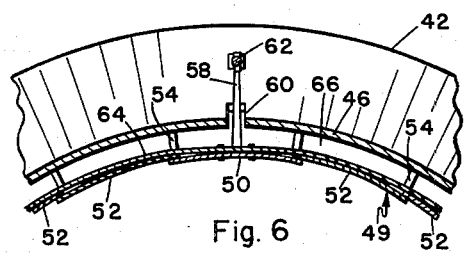
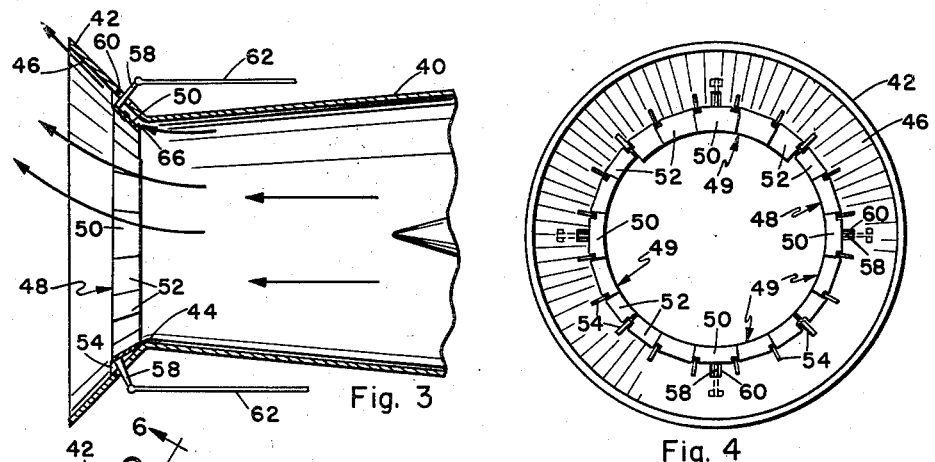
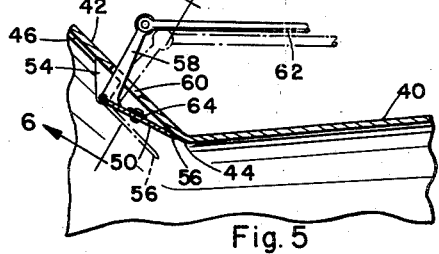
INVENTOR.
CONSTANT V. DAVID

2,968,921

AERODYNAMIC JET DEFLECTING NOZZLE

Constant V. David, San Diego, Calif., assignor to Ryan Aeronautical Co., San Diego, Calif.

Filed Dec. 23, 1957, Ser. No. 704,662

1 Claim. (Cl. 60—35.54)

The present invention relates generally to directional control of jet engine exhaust gases and more particularly to an aerodynamic jet deflecting nozzle.

The primary object of this invention is to provide a jet deflecting nozzle having a divergent terminal nozzle portion and means for creating an impressed or artificial boundary layer at portions of the divergent nozzle to induce the main gas stream to be deflected in a certain direction.

Another object of this invention is to provide a jet deflecting nozzle in which the jet deflection may be accurately controlled to provide offset thrust in any direction.

Another object of this invention is to provide a jet deflecting nozzle which is extremely light in weight and has a minimum of parts.

A futrher object of this invention is to provide a jet deflecting nozzle which may be fitted to many different types of jet engine installations and used for directional and stabilizing control, or to supplement the conventional controls.

Another object of this invention is to provide a jet deflecting nozzle which is practicable and inexpensive to manufacture.

Finally, it is an object to provide a jet deflecting nozzle of the afore-mentioned character which is simple to operate and which will give generally efficient and durable service.

With these and other objects definitely in view, this invention consists in the novel construction, combination and arrangement of elements and portions, as will be hereinafter fully described in the specification, particularly pointed out in the claim, and illustrated in the drawing which forms a material part of this disclosure, and in which:

Figure 1 is a fragmentary longitudinal sectional view of the nozzle fitted to a jet engine tailpipe;

Figure 2 is a sectional view taken on the line 2—2 of Figure 1;

Figure 3 is a longitudinal sectional view of a modified form of the nozzle;

Figure 4 is an end elevation view of the nozzle shown in Figure 3;

Figure 5 is an enlarged fragmentary sectional view similar to a portion of Figure 3; and Figure 6 is a fragmentary sectional view taken on the line 6—6 of Figure 5.

Similar characters of reference indicate similar or identical elements and portions throughout the specification and throughout the views of the drawing.

Referring now to the embodiment of this invention, illustrated in Figures 1 and 2 of the drawing, the device is attached to the rear end of a jet engine tailpipe 10 having a small annular divergent lip 12 at the exhaust orifice 14. Surrounding the end of the tailpipe 10 and coaxial therewith is a divergent nozzle 16 having a generally conoidal wall 18 which extends longitudinally beyond the lip 12 and is spaced slightly from said lip to provide an annular, divergent throat 20 therebetween. Integral with the forward end of the nozzle 16 is an annular plenum chamber 22 communicating with the throat 20, the forward periphery of said plenum chamber being sealed to the tailpipe 10 as indicated at 24. The plenum chamber 22 is internally divided into four segments my means of radially disposed baffles 26, the chambers including an upper chamber segment 28, lower chamber segment 30, right chamber segment 32 and left chamber segment 34. Connected to each of the chamber segments 28—34 is a pipe 36 to which a vacuum is applied. The vacuum may be obtained from an ejector or similar device as desired.

In operation, vacuum is applied to a portion of the plenum chamber 22, such as the upper chamber segment 28 as indicated in Figure 1. The air is drawn inwardly through the throat 20 and artificially generates a boundary layer along the inner surface of the nozzle wall 18 which induces the adjacent portion of the jet exhaust stream to bend toward that portion of the wall 18, with the result that the jet stream is deflected as indicated by the directional arrows. This aerodynamic effect is well known in the art. By supplying vacuum to any one or more of the chamber segments 28—34, the jet stream can be deflected in any required direction.

An alternative embodiment of tnis invention for achieving jet deflection by boundary layer control is illustrated in Figures 3-6. In this configuration a tailpipe 40 is provided with an integral divergent nozzle 42 extending from the exhaust orifice 44, said nozzle having a wall 46. Within the nozzle 42 and concentric therewith is a deflector ring 48, comprising four quadrants or vane groups 49, each group having a central or key vane 50 and a plurality of subsidiary vanes 52 on each side thereof. All of the vanes 50 and 52 are hinged at their down-stream or trailing edges between support brackets 54 extending inwardly from the nozzle 42 and are angularly disposed relative to the wall 46 so that the upstream or leading edges 56 of the vanes rest against said wall immediately aft of the orifice 44, as in Figure 5. In each vane group 49, the key vane 50 overlaps the inner edges of the subsidiary vanes 52 and the subsidiary vanes in turn are overlapped in such a manner that the key vane holds the entire group tightly against the wall 46. Fixed to each key vane 50 is a lever 58 which extends outwardly through a slot 60 in the wall 46 and is connected to an actuating rod 62, and also fixed to each key vane is a retainer spring 64 which extends outwardly in form contact with the outer faces of the subsidiary vanes 52, so that the entire group 49 moves as a unit.

To deflect the jet stream upwardly, as in Figure 3, the upper push rod 62 is moved forwardly so pulling the lever 58 and depressing the key vane 50 which, in turn, depresses the entire vane group 49 connected thereto, as shown in Figure 4, providing a throat 66 between the depressed vanes and the wall 46 through which the boundary layer of gases at the inner surface of the tailpipe 40 is deflected. This boundary layer then adheres to the divergent nozzle wall 46 and induces the main jet stream to deflect in that direction. By operating any one or more of the vane groups 49, the jet stream can thus be deflected in any direction, and the jet stream is deflected by boundary layer control without resort to an auxiliary air supply.

It will be evident that the structure described above enables the jet stream to be deflected as required by controlling only a small portion of the gas flow and is considerably lighter and simpler than other types of devices which divert the jet stream by direct reaction with vanes, baffles and the like.

It is understood that minor variation from the form of the invention disclosed herein may be made without departure from the spirit and scope of the invention, and

I claim:

An aerodynamic jet deflecting device, comprising: a fluid jet conducting tailpipe having an outlet orifice; a divergent nozzle concentric with said orifice and extending axially from said tailpipe; a deflector ring operatively mounted in said nozzle immediately downstream from said orifice, said ring including a plurality of vanes interconnected in groups; said vanes being pivotally mounted on said nozzle at their downstream edges and spaced inwardly from said nozzle; said nozzle extending downstream beyond said vanes; the upstream edge of said vanes being substantially flush with said nozzle in one position; and means for opening selected groups of said vanes to extend their upstream edges into the jet stream and define a throat between said vanes and said nozzle, whereby a portion of the jet stream is deflected through said throat to provide a boundary layer flow substantially parallel to the adjacent portion of the surface of said nozzle.

References Cited in the file of this patent

UNITED STATES PATENTS

| | | |
|---|---|---|
| 2,108,652 | Coanda | Feb. 15, 1938 |
| 2,794,317 | Brown | June 4, 1957 |
| 2,798,362 | Rainbow et al. | July 9, 1957 |
| 2,799,990 | Hausmann | July 23, 1957 |
| 2,841,955 | McLafferty | July 8, 1958 |
| 2,846,164 | Haberkorn | Aug. 5, 1958 |

FOREIGN PATENTS

| | | |
|---|---|---|
| 501,767 | Belgium | Mar. 31, 1951 |
| 1,060,291 | France | Nov. 18, 1953 |
| 750,687 | Great Britain | June 20, 1956 |